(12) United States Patent
Murgatroyd et al.

(10) Patent No.: US 11,377,787 B2
(45) Date of Patent: Jul. 5, 2022

(54) BASIC DYE MIXTURES FOR ARAMID FIBRES

(71) Applicant: DyStar Colours Distribution GmbH, Raunheim (DE)

(72) Inventors: Adrian Murgatroyd, Frankfurt am Main (DE); Manfred Hoppe, Kürten (DE); Clemens Grund, Hattersheim (DE); Brian Connolly, Lohmar (DE); Thomas Stepanski, Cologne (DE)

(73) Assignee: DYSTAR COLOURS DISTRIBUTION GMBH, Raunheim (DE)

( * ) Notice: Subject to any disclaimer, the term of this patent is extended or adjusted under 35 U.S.C. 154(b) by 0 days.

(21) Appl. No.: 16/095,176

(22) PCT Filed: Dec. 7, 2017

(86) PCT No.: PCT/EP2017/081771
§ 371 (c)(1),
(2) Date: Oct. 19, 2018

(87) PCT Pub. No.: WO2018/108682
PCT Pub. Date: Jun. 21, 2018

(65) Prior Publication Data
US 2019/0338461 A1    Nov. 7, 2019

(30) Foreign Application Priority Data
Dec. 15, 2016   (EP) ..................................... 16204228

(51) Int. Cl.
*D06P 1/42*    (2006.01)
*C09B 67/00*    (2006.01)
(Continued)

(52) U.S. Cl.
CPC ............ *D06P 1/42* (2013.01); *C09B 67/0041* (2013.01); *C09B 67/0051* (2013.01); *D06P 1/10* (2013.01); *D06P 3/242* (2013.01); *D06P 3/28* (2013.01)

(58) Field of Classification Search
CPC ...... D06P 1/42; D06P 1/10; D06P 3/28; D06P 3/242; C09B 67/0041; C09B 67/0051
See application file for complete search history.

(56) References Cited
U.S. PATENT DOCUMENTS 3,674,420 A    7/1972   Sapers
3,770,371 A   *   11/1973   Bossard  ............. C09B 67/0071
                                                  8/598

(Continued)

FOREIGN PATENT DOCUMENTS

DE    2314406 A1    9/1973
DE    2915323 A1    11/1979
(Continued)

OTHER PUBLICATIONS

Ayyangar et al. Action of Sodium Dithionite on Some Cationic Dyes, Indian Journal of Chemistry, vol. 20B, Sep. 1981, pp. 763-766.*
Pubchem (Basic Blue 41), Sep. 9, 2019.*
Sigma Aldrich Basacryl Red GL, Sep. 10, 2019.*
International Search Report for PCT/EP2017/081771 dated Mar. 2, 2018.
Written Opinion of the International Searching Authority for PCT/EP2017/081771 dated Mar. 2, 2018.
N. R. Ayyangar et al., "Action of sodium dithionite of some cationic dyes", Indian Journal of Chemistry Including Medicinal Chemistry, vol. 20B, No. 9, pp. 763-766, Sep. 1, 1981, XP009194316.
(Continued)

*Primary Examiner* — Amina S Khan
(74) *Attorney, Agent, or Firm* — Faegre Drinker Biddle & Reath LLP

(57) ABSTRACT

The present invention is directed to dye mixtures comprising structures of formula and their production and their use for dyeing textiles and in particular for dyeing aramid fibres.

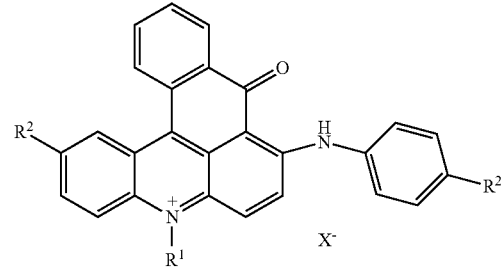

(I)

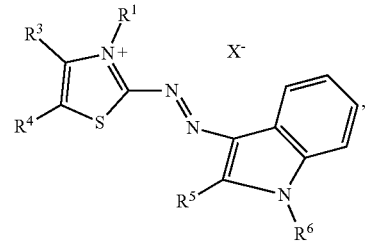

(IIa)

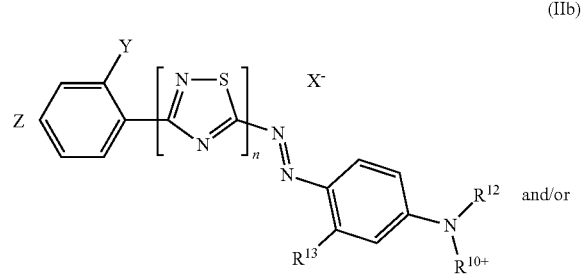

(IIb)

and/or (Continued)

-continued

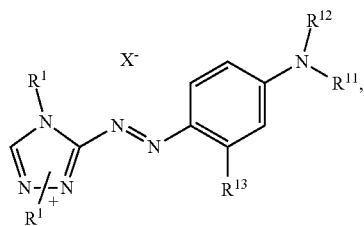

(IIc)

15 Claims, No Drawings

(51) Int. Cl.
D06P 1/10 (2006.01)
D06P 3/24 (2006.01)
D06P 3/28 (2006.01)
C09B 67/22 (2006.01)

(56) References Cited

U.S. PATENT DOCUMENTS

| 3,892,725 | A | 7/1975 | Stiot et al. |
| 3,932,377 | A | 1/1976 | Merlo et al. |
| 4,273,707 | A | 6/1981 | Pedrazzi |
| 4,780,105 | A | 10/1988 | White et al. |
| 6,551,362 | B2 * | 4/2003 | Guthrie ............... C09B 67/0075 |
| | | | 8/607 |
| 2002/0144362 | A1 | 10/2002 | Guthrie et al. |

FOREIGN PATENT DOCUMENTS

| GB | 1282281 | A |   | 7/1972 |
| JP | 2011184493 | A |   | 9/2011 |
| SU | 981330 |   | * | 12/1982 ............. C09B 43/00 |

OTHER PUBLICATIONS

Database WP Week 201164 Thomson Scientific, London, GB, AN 2011-L94754, JP 2011 184493 (Nippon Kayaku KK, Sep. 22, 2011.
International Preliminary Report on Patentability received for PCT Patent Application No. PCT/EP2017/081771, dated Jun. 27, 2019, 7 pages.
Stepanov et al., Study of the methylation of 8-p-toluidino-2-methyl-9-ceramidone, izvestiya vysshikh uchebnykh zavedenii, vol. 25, No. 1, 1982, pp. 94-97.

* cited by examiner

BASIC DYE MIXTURES FOR ARAMID FIBRES

CROSS-REFERENCE TO RELATED APPLICATIONS

This application is a national stage application (under 35 U.S.C. § 371) of PCT/EP2017/081771, filed Dec. 7, 2017, which claims benefit of European Application No. 16204228.7, filed Dec. 15, 2016, both of which are incorporated herein by reference in their entirety.

The present invention relates to the field of Basic dyes, which are well known and are used for dyeing and printing of synthetic acrylic (Polyacrylonitrile, PAN) fibre material. In addition basic dyes can be used to colour aromatic polyamide fibre types (Aramid fibres). Aramid fibres are known under various trade names.

Due to its extremely high crystallinity and compactness the dyeing process of Aramid fibres is difficult and has been widely evaluated and published, including the usage of some cationic dyes (U.S. Pat. Nos. 3,674,420, 4,780,105 and US 2002/0144362).

Besides the problems related to the dyeing processes of aramid fibres there are also major deficiencies in the resulting fastness properties of the dyed fabric, especially in light fastness.

It is an object of the present invention to provide improved mixtures of basic dyes, which are suitable for dyeing synthetic m-Aramid fibre material and are delivering improved fastness properties, especially in lightfastness, in the reddish, violet, navy, brown, khaki, olive, green and black shade area.

The present invention is directed to dye mixtures comprising at least one dye of formula (I)

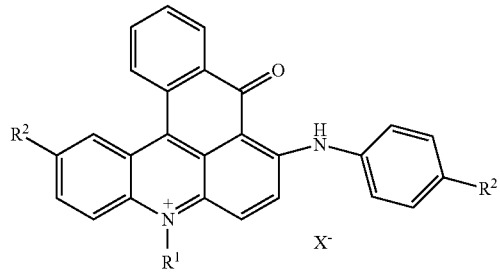

and at least one dye selected from the list consisting of dyes of formula (IIa), (IIb) and (IIc)

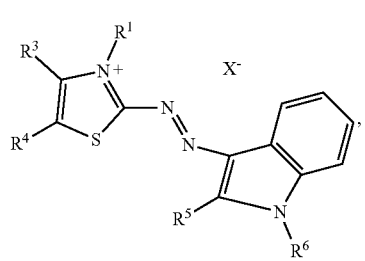

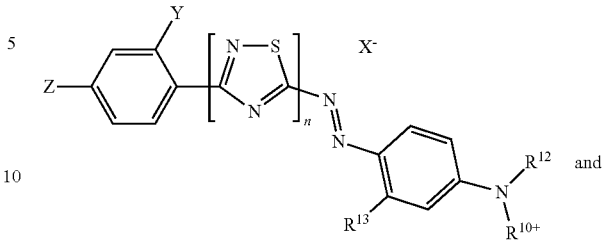

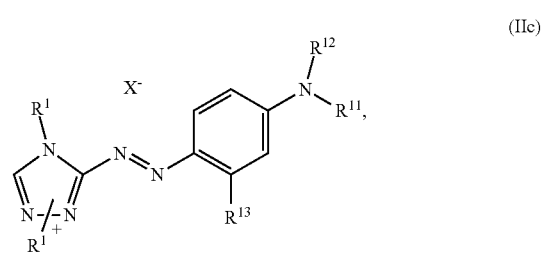

wherein independent from each other $R^1$ and $R^6$ is $C_1$-$C_4$-alkyl, $R^3$, $R^4$ and $R^{13}$ is hydrogen or ($C_1$-$C_4$)-alkyl, $R^5$ is hydrogen, ($C_1$-$C_4$)-alkyl or phenyl, $R^7$ is hydrogen, ($C_1$-$C_4$)-alkyl or ($C_1$-$C_4$)-alkoxy, $R^{10+}$ is —$(CH_2)_p$—$N^+R^1(CH_3)_2$ or —$(CH_2)_p$—$N^+R^1$ $(CH_3)$—$CH_2$—$CHCH_3$—OH, wherein p is 2 to 4, $R^2$, $R^{11}$ and $R^{12}$ is ($C_1$-$C_4$)-alkyl, ($C_1$-$C_4$)-alkyl substituted by halogen, phenyl or benzyl substituted by ($C_1$-$C_8$)-alkyl, n is 0 or 1, $X^-$ is an anion, Y is hydrogen, cyano or halogen and z is hydrogen, nitro, cyano or halogen.

Dyes of general structure (I) can be synthesized e.g. as described below in the example section. The dyes of general structure (II) can by synthesised according to "Industrial Dyes" (Editor: Klaus Hunger) Wiley-VCH Verlag GmbH & Co. KGaA, Weinheim, 2003; Chapter 3.7, Page 227 ff; ISBN: 3-527-30426-6. In particular synthesis of structures of general formula (IIa) are disclosed in JP 2011184493, synthesis for those of general structure (IIb) are disclosed in DE-OS 2915323 and those or structure (IIc) in GB 1282281.

Dye (IIc) evolves from synthesis as two different isomers (IIc-a) and (IIc-b) represented both by (IIc)

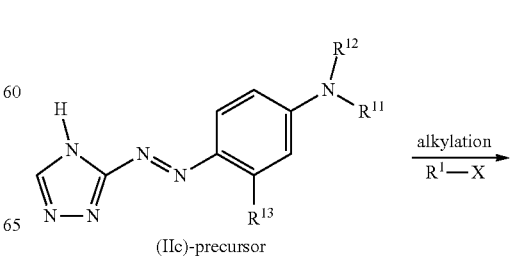

(IIc)-precursor

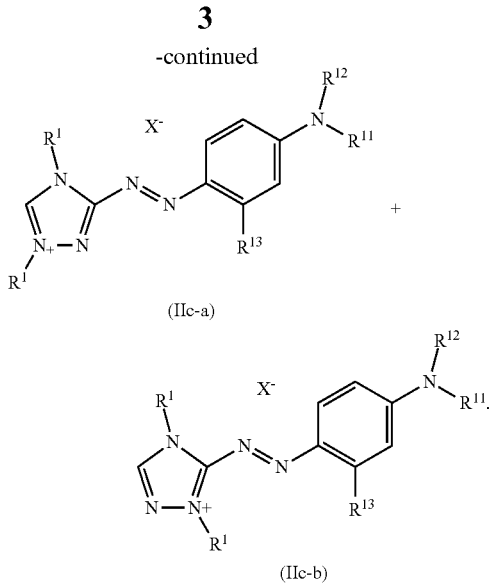

(IIc-a)

(IIc-b)

Preferred are dye mixtures, comprising one dye according to formula (I) and one dye according to formula (II). Dye mixtures comprising one dye of formula (I) and two or more dyes of formula (II) form another preferred aspect of the present invention. As such dye mixtures having a composition comprising
- one dye according to formula (I) and one dye according to any one of (IIa), (IIb) and (IIc),
- one dye of formula (I), one dye of formula (IIa) and one dye of formula (IIb),
- one dye of formula (I), one dye of formula (IIa) and one dye of formula (IIc),
- one dye of formula (I), one dye of formula (IIb) and one dye of formula (IIc) and
- one dye of formula (I), one dye of formula (IIa), one dye of formula (IIb) and one dye of formula (IIc)

all form preferred embodiments of the present invention.

More preferred is a dye mixture as described above, comprising at least one dye of formula (III)

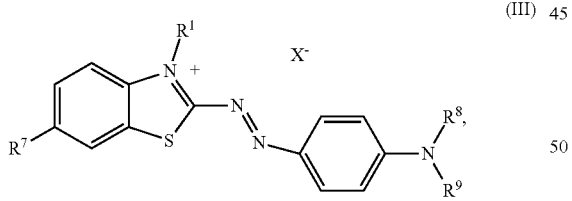

(III)

wherein independent from each other
$R^1$ is $C_1$-$C_4$-alkyl,
$R^7$ is hydrogen, ($C_1$-$C_4$)-alkyl or ($C_1$-$C_4$)-alkoxy,
$R^8$ is hydrogen or ($C_1$-$C_4$)-alkyl,
$R^9$ is ($C_1$-$C_4$)-alkyl, ($C_1$-$C_4$)-alkoxy or —$(CH_2)_m$—OH, wherein m is 2 to 4, and
$X^-$ is an anion.

Also the dyes of general structure (III) can by synthesised according to "Industrial Dyes" (Editor: Klaus Hunger) Wiley-VCH Verlag GmbH & Co. KGaA, Weinheim, 2003; Chapter 3.7, Page 227 ff; ISBN: 3-527-30426-6 or according to e.g. CH 745871 or DE-OS 2314406.

Even more preferred is a dye mixture as described above, wherein independent from each other
$R^1$, $R^2$, $R^6$, $R^8$ and $R^{12}$ is ($C_1$-$C_2$)-alkyl,
$R^3$, $R^4$ and $R^{13}$ is hydrogen or ($C_1$-$C_2$)-alkyl,
$R^5$ is ($C_1$-$C_2$)-alkyl or phenyl,
$R^7$ is ($C_1$-$C_2$)-alkyl or ($C_1$-$C_2$)-alkoxy,
$R^9$ is ($C_1$-$C_2$)-alkyl, ($C_1$-$C_2$)-alkoxy or —$(CH_2)_m$—OH, wherein m is 2 to 4,
$R^{10+}$ is —$(CH_2)_p$—$N^+R^1(CH_3)_2$ or —$(CH_2)_p$—$N^+R^1(CH_3)$—$CH_2$—$CHCH_3$—OH,
wherein with p is 2 or 3,
$R^{11}$ is ($C_1$-$C_4$)-alkyl or benzyl,
n is 0 or 1,
whereby
Y is cyano or halogen and z is nitro, cyano or halogen when n is 0 or
Y and z both are hydrogen when n is 1 and
$X^-$ is an anion.

Within these groups of dye mixtures there exist preferred dye mixtures based on preferred selections of single dyes:

Accordingly a dye mixture as described above is particularly preferred, wherein at least one dye of formula (I) is selected from the group consisting of:

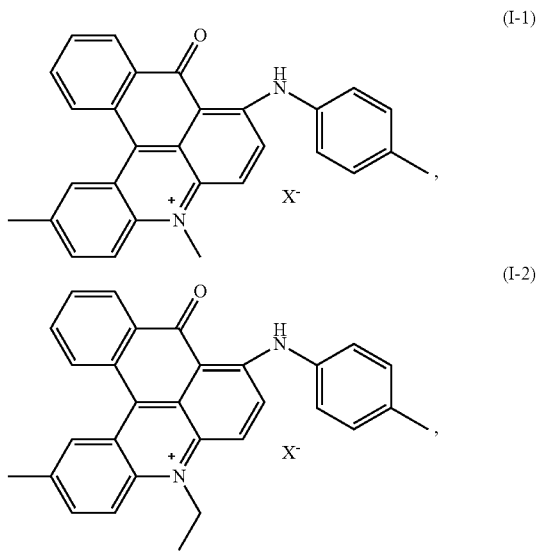

(I-1), (I-2),

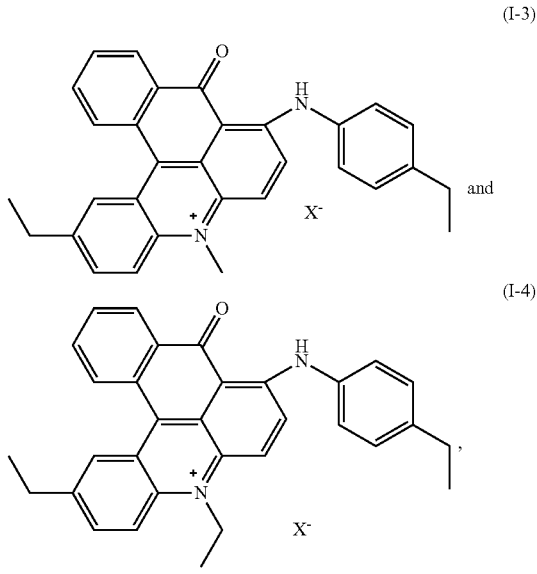

(I-3) and (I-4), wherein $X^-$ is an anion.

Also a dye mixture as described above, wherein at least one dye of formula (IIa) is present and is selected from the group consisting of:

(IIa-1)
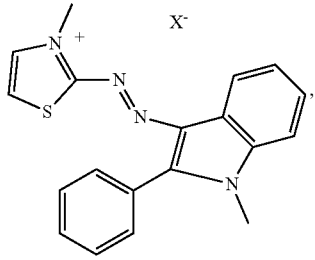

(IIa-2)
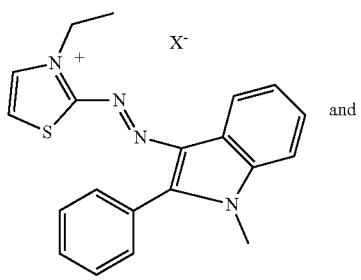
and (IIa-3)
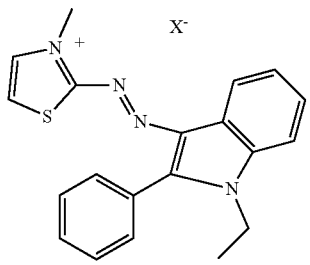

wherein X⁻ is an anion is particularly preferred.

Also particularly preferred is a dye mixture as described above, wherein at least one dye of formula (IIb) is present and is selected from the group consisting of:

(IIb-1)
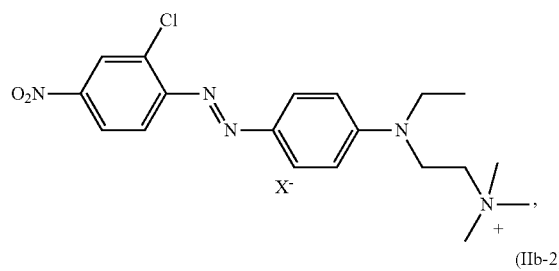

(IIb-2)
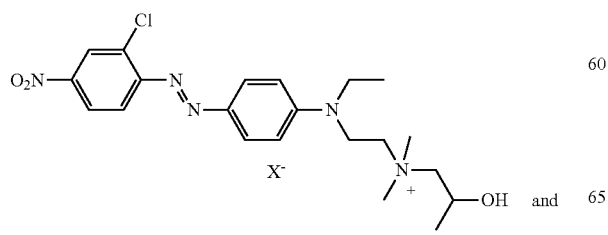
and (IIb-3)
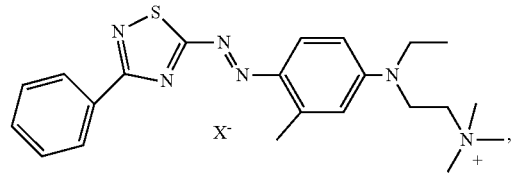

wherein X⁻ is an anion.

A dye mixture as described above, wherein at least one dye of formula (IIc) is present and is selected from the list consisting of:

(IIc-1)
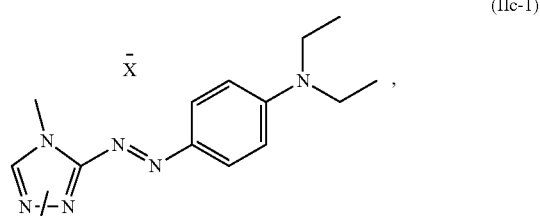

(IIc-2)
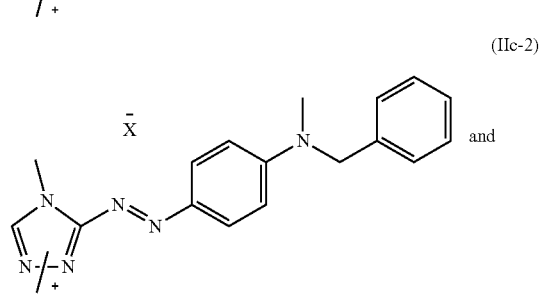
and (IIc-3)
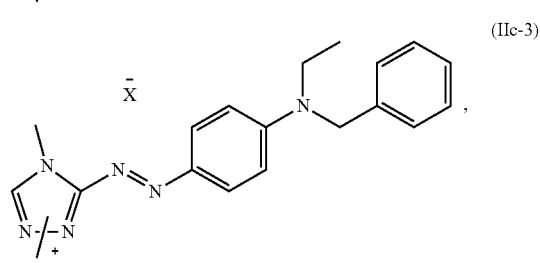

wherein X⁻ is an anion, forms another particularly preferred embodiment of the present invention.

A dye mixture as described above, wherein at least one dye of formula (III) is present and is selected from the list consisting of:

(III-1)
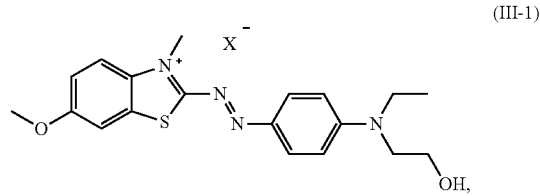

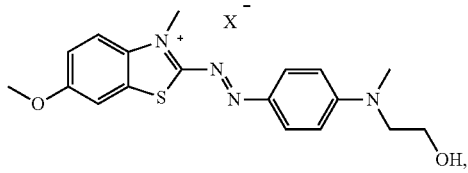
(III-2)

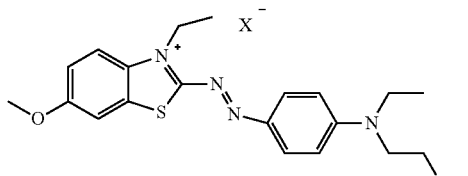
(III-3)

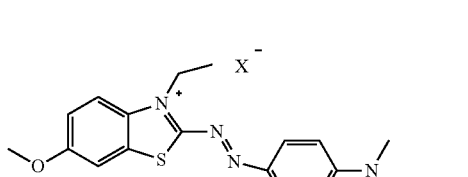
(III-4)

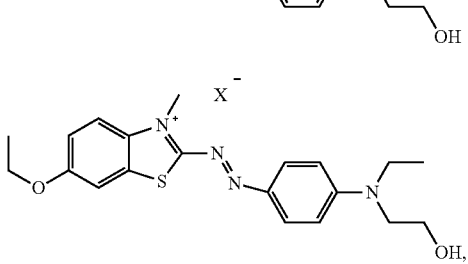
(III-5)

wherein X⁻ is an anion is even more preferred.

Combinations of dyes according to the invention are preferred, wherein the single dyes are preferred members of the mixture as is outlined above. A dye mixture, comprising two or more preferred dyes according to the selections above is even more preferred. A dye mixture as described above, comprising dyes of formula
(I-1) and/or (I-2),
(IIa-1) and/or (IIa-2) and
(III-1) and/or (III-3)
is particularly preferred and
a dye mixture as described above, comprising dyes of formula
(I-1) and (IIa-1) and (III-3)
is most preferred.

Also regarding the selection of the counterion of the cationic dyes used in the dye mixtures of the present invention there exist preferred ones. Accordingly a dye mixture as described above, wherein the anion is selected from the group consisting of halogen, sulfate, hydrogensulfate, aminosulfate, nitrate, phosphate, dihydrogenphosphate, hydrogenphosphate, polyphosphate, hydrogencarbonate, carbonate, methosulfate, ethosulfate, cyanate, tri-chlorozincate, tetra-chlorozincate, ($C_1$-$C_4$)-alkylsulfonate, benzenesulfonate, naphthalinsulfonates, borate, tetra-borofluorate, ($C_1$-$C_4$)-alkylcarboxylate, hydroxy-($C_1$-$C_4$)-alkylcarboxylate, benzenecarboxylate and naphthalincarboxylate is preferred. More preferred is a dye mixture as described above, wherein the anion is selected from the group consisting of formiate, acetate, propionate, lactate, benzoate, chloride, trichlorozincate, tetrachlorozincate, methosulfate and ethosulfate.

The proportions of the single dyes in the dye mixtures of the present invention may vary in a broad range and a dye mixture as described above, comprising dyes of formula
(I): 1 to 99 and
(IIa)/(IIb)/(IIc): 99 to 1
weight % of the total amount of dyes in the dye mixture is preferred. The total amount of dyes represents 100 wt % in the dye mixture.

More preferred is a dye mixture as described above, comprising dyes of formula
(I): 50 to 90,
(IIa)/(IIb)/(IIc): 45 to 5,
(III): 30 to 5
weight % of the total amount of dyes in the dye mixture.

And most preferred is a dye mixture as described above, comprising dyes of formula
(I): 50 to 80,
(IIa)/(IIb)/(IIc): 30 to 10,
(III): 25 to 10,
weight % of the total amount of dyes in the dye mixture.

A solution for dyeing comprising a dye mixture as described above forms another preferred embodiment of the present invention.

Also a process for the production of a dye mixture as described above, comprising
a) mixing the components of the dye mixture,
b) homogenizing the mixture obtained in step a)
forms an aspect of the present invention.

A process for dyeing or printing material, comprising contacting the material with a dye mixture as described above and/or a solution as described above forms yet another aspect of the present invention.

EXAMPLES

Example A—Synthesis

To 370 parts of n-Butanol and 41 parts of water 109.8 parts (0.517 mol) of Quinizarine (CAS 81-64-1) and 14.4 parts of Leuco-quinizarine (CAS 17648-03-2) were added under stirring. To this mixture 9.6 parts Boric acid (CAS 10043-35-3) and 122 parts (1.14 mol) of p-Toluidin (CAS106-49-0) were added.

The reaction mixture was heated under stirring to reflux (96° C.) and kept for 20 hours under stirring.

The reaction mixture was then cooled down to 50 to 60° C. and the product was filtered and washed with methanol and demineralized water.

After drying under vacuum conditions 130 parts of Intermediate A were obtained.

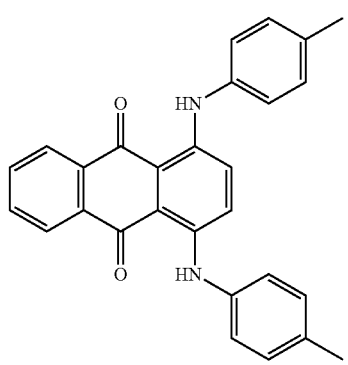
Intermediate A

Example B—Synthesis 10 parts of Precursor A were added to 265 parts of 55% Sulfuric acid at 0 to 5° C. under stirring.

The reaction mixture was then heated up to 125° C. under stirring and kept at this temperature for 11 hours.

The Mixture was cooled down to 25° C. under stirring, a black suspension was observed. The mixture was filtered and washed with water.

The filtered solid was re-slurried in 200 ml of demineralized water and the pH was adjusted to pH 11 with $NH_4OH$ solution and stirred for 3 hours.

The reddish Brown solid product was again filtrated and washed with demineralized water and dried under vacuum conditions to deliver: 9.2 g of Intermediate B

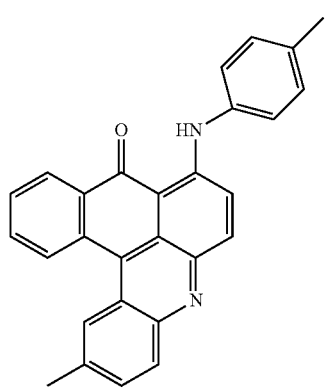

Intermediate B

Example C—Synthesis 20 parts of dry Intermediate B (<0.5% water content) and 2 parts of MgO were added to 200 parts of dry Chlorobenzene.

The mixture was stirred and heated up to 135° C. and stirred for 30 to 45 min until a solution was reached. 20 parts of Dimethylsulfate were added and the mixture was stirred for 4 h at 120 to 125° C. The reaction mixture was cooled down to 70 to 75° C. and 20 parts of water and 10 parts of diluted Hydrochloric acid were added and the mixture was stirred for 1 h.

The excess of Dimethylsulfate was destroyed by cooling down the mixture to 50 to 55° C. and adding 10 parts of diluted hydrochloric acid and stirring 2 h at 50 to 55° C. Then the mixture was filtrated, washed with Chlorobenzene Methanol and water.

After drying under vacuum conditions 12 g of the final dye (I-1) with $X^- = CH_3SO_4^-$ were obtained.

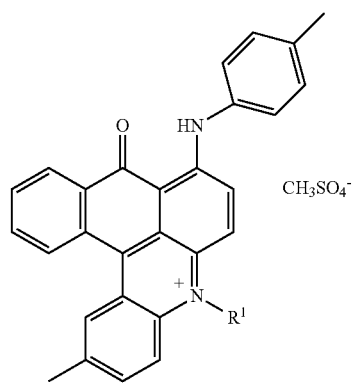

Example C = (I-1) with $X^- = CH_3CHO_4^-$

Example D—Powder Formulation 36 parts of dye (I-2), with $X^- = CH_3SO_4^-$ and 14 parts of dye (IIc-1), with $X^- = ZnCl_3^-$ and 4 parts white oil 90 as a dedusting agent and 1 part of Avolan® IW as a wetting agent and 45 parts of Dextrin as a cutting agent were homogeneously mixed and milled with a Bauermeister type of mill using a 2 mm size sieve. This delivered 97 parts of a black powder that dyes m-Aramid fibres in deep black shades.

Other dedusting-agents, wetting-agents and also cutting-agents, like sodiumsulfate, sodium-chloride, rice starch, maize starch amidosulfonic acid can be used to formulate powder products.

Liquid formulations have advantages in some applications of the claimed dyes. Those liquid formulations can be prepared by special synthesis procedures directly delivering a liquid formulation or by dissolving the isolated final product in water-soluble organic solvents or mixtures of those solvents with water.

Example E—Liquid Formulation 8.25 parts of dye (I-1), with $X^- = CH_3SO_4^-$ and 4.8 parts of dye (IIa-1), with $X^- = Cl^-$ and 2.2 parts of dye (III-1), with $X^- = Cl^-$ were added under stirring to 85 parts of ethylene glycol at room temperature. The mixture was stirred for 3 hours until a clear solution was reached. The solution was filtrated to remove possible insoluble parts and delivered then deep Black dyeings on m-Aramid fibres.

The dye samples were synthesized as outlined above. The dye mixtures were then prepared as in the following examples.

Example 1—Dye Mixture 72 parts of the green basic dye of the formula (I-2) (with $X^- = ZnCl_3^-$) and 28 parts of the red basic dye of the formula (IIc-1) (with $X^- = ZnCl_3^-$), were prepared according to Example D. The resultant dye mixture of the invention provides grey and black dyeings and prints, on meta-aramid, under the dyeing conditions previously described.

Example 2—Dye Mixture 76 parts of the green basic dye of the formula (I-2) (with $X^- = CH_3CH_2SO_4^-$), 14 parts of the red basic dye of the formula (IIa-1) (with $X^- = Cl^-$) and 10 parts of the blue basic dye of the formula (III-1) (with $X^- = ZnCl_3^-$), were prepared according to Example D The resultant dye mixture of the invention provides grey and black dyeings and prints, on meta-aramid, under the dyeing conditions previously described.

Example 3—Dye Mixture 85 parts of the green basic dye of the formula (I-1) (with $X^- = Cl^-$), 9 parts of the red basic dye of the formula (IIc-1) (with $X^- = ZnCl_3^-$) and 6 parts of the blue basic dye of the formula (III-1) (with $X^- = Cl^-$), were prepared according to Example D.

The resultant dye mixture of the invention provides olive dyeings and prints, on meta-aramid, under the dyeing conditions previously described.

Further mixtures listed in the table below provide dyeing's with Olive, Brown, Grey & Black shades.

| | Component I | | | Component II | | | Component III | | |
|---|---|---|---|---|---|---|---|---|---|
| Example | Structure | $X^-$ | % | Structure | $X^-$ | % | Structure | $X^-$ | % |
| 4 | I-1 | $CH_3SO_4^-$ | 86 | IIa-1 | $Cl^-$ | 8 | III-1 | $Cl^-$ | 6 |
| 5 | I-1 | $CH_3SO_4^-$ | 71 | IIa-1 | $Cl^-$ | 17 | III-1 | $Cl^-$ | 12 |
| 6 | I-1 | $CH_3SO_4^-$ | 66 | IIa-1 | $Cl^-$ | 18 | III-1 | $Cl^-$ | 16 |
| 7 | I-1 | $CH_3SO_4^-$ | 60 | IIa-1 | $Cl^-$ | 19 | III-1 | $Cl^-$ | 21 |
| 8 | I-1 | $Cl^-$ | 63 | IIa-1 | $ZnCl_3^-$ | 22 | III-1 | $Cl^-$ | 15 |
| 9 | I-1 | $CH_3SO_4^-$ | 50 | IIa-1 | $Cl^-$ | 42 | III-1 | $Cl^-$ | 8 |
| 10 | I-1 | $ZnCl_3^-$ | 82 | IIa-2 | $Cl^-$ | 13 | III-1 | $ZnCl_3^-$ | 5 |
| 11 | I-1 | $CH_3SO_4^-$ | 71 | IIa-2 | $CH_3SO_4^-$ | 16 | III-1 | $Cl^-$ | 13 |
| 12 | I-1 | $CH_3SO_4^-$ | 59 | IIa-2 | $Cl^-$ | 22 | III-1 | $Cl^-$ | 19 |
| 13 | I-1 | $CH_3SO_4^-$ | 48 | IIa-2 | $ZnCl_3^-$ | 40 | III-1 | $Cl^-$ | 12 |
| 14 | I-1 | $CH_3SO_4^-$ | 87 | IIa-1 | $Cl^-$ | 9 | III-3 | $Cl^-$ | 4 |
| 15 | I-1 | $CH_3SO_4^-$ | 75 | IIa-1 | $Cl^-$ | 15 | III-3 | $CH_3SO_4^-$ | 10 |
| 16 | I-1 | $CH_3SO_4^-$ | 63 | IIa-1 | $Cl^-$ | 22 | III-3 | $Cl^-$ | 15 |
| 17 | I-1 | $CH_3SO_4^-$ | 85 | IIa-2 | $CH_3SO_4^-$ | 9 | III-3 | $Cl^-$ | 6 |
| 18 | I-1 | $CH_3SO_4^-$ | 74 | IIa-2 | $Cl^-$ | 16 | III-3 | $Cl^-$ | 10 |
| 19 | I-1 | $CH_3SO_4^-$ | 60 | IIa-2 | $Cl^-$ | 24 | III-3 | $Cl^-$ | 16 |
| 20 | I-1 | $Cl^-$ | 82 | IIa-1 | $Cl^-$ | 18 | — | — | — |
| 21 | I-1 | $CH_3SO_4^-$ | 73 | IIa-1 | $Cl^-$ | 27 | — | — | — |
| 22 | I-1 | $CH_3SO_4^-$ | 60 | IIa-1 | $CH_3SO_4^-$ | 40 | — | — | — |
| 23 | I-1 | $Cl^-$ | 85 | IIa-2 | $Cl^-$ | 15 | — | — | — |
| 24 | I-1 | $CH_3SO_4^-$ | 76 | IIa-2 | $Cl^-$ | 24 | — | — | — |
| 25 | I-1 | $CH_3SO_4^-$ | 55 | IIa-2 | $ZnCl_3^-$ | 45 | — | — | — |
| 26 | I-2 | $Cl^-$ | 82 | IIa-1 | $Cl^-$ | 13 | III-1 | $Cl^-$ | 5 |
| 27 | I-2 | $CH_3CH_2SO_4^-$ | 71 | IIa-1 | $Cl^-$ | 17 | III-1 | $Cl^-$ | 12 |
| 28 | I-2 | $CH_3CH_2SO_4^-$ | 85 | IIa-2 | $Cl^-$ | 12 | III-1 | $CH_3SO_4^-$ | 3 |
| 29 | I-2 | $CH_3CH_2SO_4^-$ | 75 | IIa-2 | $Cl^-$ | 15 | III-1 | $Cl^-$ | 10 |
| 30 | I-3 | $CH_3SO_4^-$ | 80 | IIa-2 | $Cl^-$ | 12 | III-1 | $Cl^-$ | 8 |
| 31 | I-4 | $ZnCl_3^-$ | 75 | IIa-2 | $Cl^-$ | 15 | III-1 | $ZnCl_3^-$ | 10 |
| 32 | I-2 | $CH_3CH_2SO_4^-$ | 82 | IIa-1 | $Cl^-$ | 13 | III-3 | $Cl^-$ | 5 |
| 33 | I-2 | $CH_3CH_2SO_4^-$ | 71 | IIa-1 | $Cl^-$ | 17 | III-3 | $Cl^-$ | 12 |
| 34 | I-2 | $CH_3CH_2SO_4^-$ | 85 | IIa-2 | $Cl^-$ | 12 | III-3 | $Cl^-$ | 3 |
| 35 | I-3 | $CH_3SO_4^-$ | 75 | IIa-2 | $Cl^-$ | 15 | III-3 | $Cl^-$ | 10 |
| 36 | I-4 | $Cl^-$ | 80 | IIa-2 | $Cl^-$ | 12 | III-3 | $Cl^-$ | 8 |
| 37 | I-2 | $CH_3CH_2SO_4^-$ | 75 | IIa-2 | $Cl^-$ | 15 | III-3 | $Cl^-$ | 10 |
| 38 | I-2 | $ZnCl_3^-$ | 81 | IIa-1 | $Cl^-$ | 19 | — | — | — |
| 39 | I-2 | $CH_3CH_2SO_4^-$ | 74 | IIa-1 | $Cl^-$ | 26 | — | — | — |
| 40 | I-2 | $CH_3CH_2SO_4^-$ | 55 | IIa-1 | $Cl^-$ | 45 | — | — | — |
| 41 | I-2 | $CH_3CH_2SO_4^-$ | 80 | IIa-2 | $ZnCl_3^-$ | 20 | — | — | — |
| 42 | I-2 | $CH_3CH_2SO_4^-$ | 65 | IIa-2 | $Cl^-$ | 35 | — | — | — |
| 43 | I-3 | $CH_3SO_4^-$ | 60 | IIa-1 | $Cl^-$ | 40 | — | — | — |
| 44 | I-4 | $CH_3CH_2SO_4^-$ | 57 | IIa-1 | $Cl^-$ | 43 | — | — | — |
| 45 | I-1 | $CH_3SO_4^-$ | 74 | IIb-2 | $Cl^-$ | 17 | III-1 | $Cl^-$ | 9 |
| 46 | I-1 | $CH_3SO_4^-$ | 55 | IIb-2 | $Cl^-$ | 25 | III-1 | $Cl^-$ | 20 |
| 47 | I-1 | $CH_3SO_4^-$ | 85 | IIb-3 | $CH_3SO_4^-$ | 10 | III-1 | $Cl^-$ | 5 |
| 48 | I-1 | $CH_3SO_4^-$ | 70 | IIb-3 | $CH_3SO_4^-$ | 20 | III-1 | $Cl^-$ | 10 |
| 49 | I-1 | $ZnCl_3^-$ | 80 | IIb-1 | $Cl^-$ | 15 | III-1 | $Cl^-$ | 5 |
| 50 | I-1 | $CH_3SO_4^-$ | 72 | IIb-1 | $Cl^-$ | 18 | III-1 | $Cl^-$ | 10 |
| 51 | I-1 | $CH_3SO_4^-$ | 85 | IIc-2 | $ZnCl_3^-$ | 10 | III-1 | $Cl^-$ | 5 |
| 52 | I-1 | $Cl^-$ | 75 | IIc-2 | $ZnCl_3^-$ | 15 | III-1 | $Cl^-$ | 10 |
| 53 | I-1 | $CH_3SO_4^-$ | 79 | IIa-3 | $Cl^-$ | 13 | III-1 | $Cl^-$ | 8 |
| 54 | I-1 | $CH_3SO_4^-$ | 66 | IIc-3 | $ZnCl_3^-$ | 21 | III-1 | $Cl^-$ | 13 |
| 55 | I-1 | $CH_3SO_4^-$ | 86 | IIa-1 | $Cl^-$ | 8 | III-2 | $Cl^-$ | 6 |
| 56 | I-1 | $ZnCl_3^-$ | 73 | IIa-1 | $Cl^-$ | 17 | III-4 | $Cl^-$ | 10 |
| 57 | I-1 | $CH_3SO_4^-$ | 75 | IIa-1 | $Cl^-$ | 15 | III-5 | $Cl^-$ | 10 |
| 58 | I-1 | $CH_3SO_4^-$ | 76 | IIa-1 | $CH_3COO^-$ | 14 | III-1 | $CH_3COO^-$ | 10 |
| 59 | I-1 | $CH_3SO_4^-$ | 65 | IIa-1 | $Cl^-$ | 15 | III-1 | $Cl^-$ | 20 |
| 60 | I-1 | $CH_3SO_4^-$ | 60 | IIa-1 | $Cl^-$ | 15 | III-1 | $Cl^-$ | 25 |
| 61 | I-1 | $CH_3SO_4^-$ | 60 | IIa-1 | $Cl^-$ | 10 | III-1 | $Cl^-$ | 30 |

The invention claimed is:
1. A dye mixture comprising at least one dye of formula (I-1)

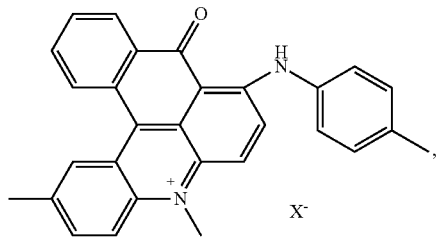

and at least one dye of the (IIa-1)

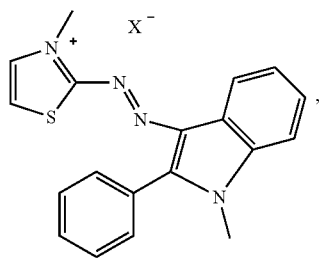

at least one dye of formula (III-1)

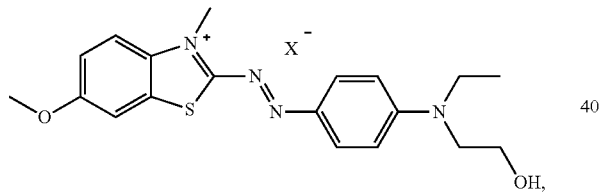

X is an anion,
wherein the dyes of formula (I-1), (II-a) and (III-1) are present in the following amount:
formula (I-1): 70 to 80 wt. %,
formula (IIa-1): 10 to 15 wt. %, and
formula (III-1): 10 to 15 wt, %,
wherein the weight % is based of the total amount of dyes in the dye mixture.

2. The dye mixture according to claim 1, wherein the anion is selected from the group consisting of halogen, sulfate; hydrogensulfate, aminosulfate, nitrate, phosphate, dihydrogenphosphate, hydrogenphosphate, polyphosphate, hydrogencarbonate, carbonate, methosulfate, ethosulfate, cyanate, tri-chlorozincate, tetra-chlorozincate, ($C_1$, $C_4$)-alkylsulfonate, benzenesulfonate, naphthalinsulfonates, borate, tetraborofluorate, ($C_1$-$C_4$)-alkylcarboxylate, hydroxy-($C_1$-$C_4$)-alkylcarboxylate, benzenecarboxylate and naphthalincarboxylate.

3. The dye mixture according to claim 1, wherein the anion is selected from the group consisting of formate, acetate, propionate, lactate, benzoate, chloride, trichlorozincate, tetrachlorozincate, methosulfate and ethosulfate.

4. A solution for dying comprising the dye mixture according to claim 1.

5. A process for the production of the dye mixture according claim 1, comprising
a) mixing the components of the dye mixture, and
b) homogenizing the mixture obtained in step a).

6. A process for dyeing or printing material, comprising contacting the material with the dye mixture according to claim 1.

7. A dye mixture comprising at least one dye of formula (I)

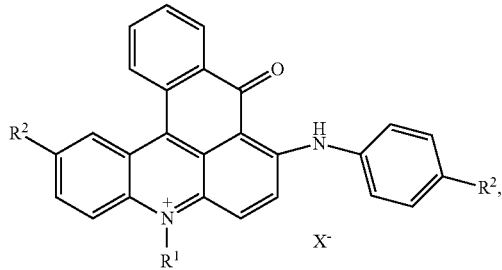

at least one dye of the formula (IIc) which is selected from the group consisting of:

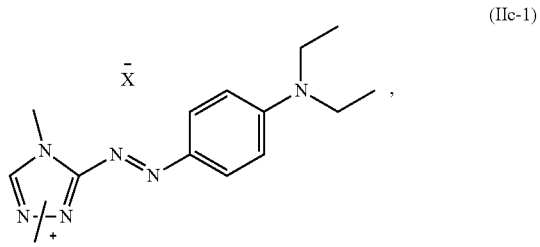

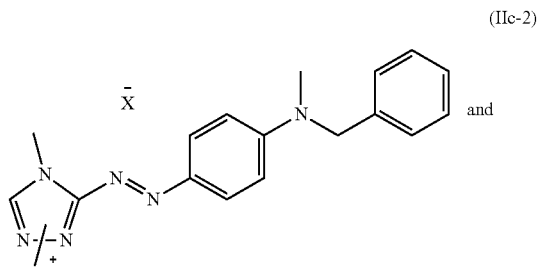

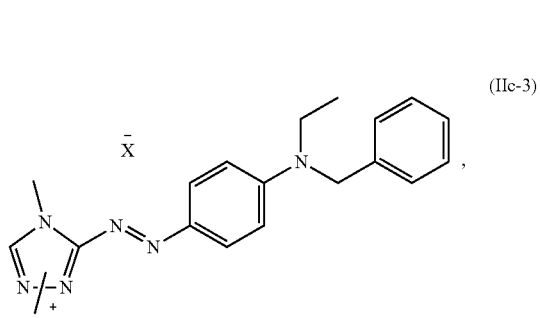

and at least one dye of the formula (III)

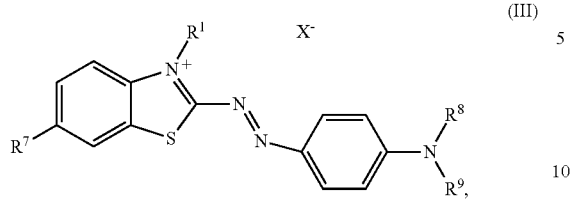
(III)

wherein independent from each other
$R^1$ is $C_1$-$C_4$-alkyl,
$R^2$ is ($C_1$-$C_4$)-alkyl, ($C_1$-$C_4$)-alkyl substituted by halogen, phenyl or benzyl substituted by ($C_1$-$C_8$)-alkyl,
$X^-$ is an anion,
$R^7$ is hydrogen, ($C_1$-$C_4$)-alkyl or ($C_1$-$C_4$)-alkoxy,
$R^8$ is hydrogen or ($C_1$-$C_4$)-alkyl, and
$R^9$ is ($C_1$-$C_4$)-alkyl, ($C_1$-$C_4$)-alkoxy or —$(CH_2)_m$—OH, wherein in is 2 to 4.

8. The dye mixture according to claim 7, wherein the anion is selected from the group consisting of halogen, sulfate, hydrogensulfate, aminosulfate, nitrate, phosphate, dihydrogenphosphate, hydrogenphosphate, polyphosphate, hydrogencarbonate, carbonate, methosulfate, ethosulfate, cyanate, tri-chlorozincate, tetra-chlorozincate, ($C_1$-$C_4$)-alkylsulfonate, benzenesulfonate, naphthalinsulfonates, borate, tetraborofluorate, ($C_1$-$C_4$)-alkylcarboxylate, hydroxy-($C_1$-$C_4$)-alkylcarboxylate, benzenecarboxylate and naphthalincarboxylate.

9. The dye mixture according to claim 7, wherein the anion is selected from the group consisting of formiate, acetate, propionate, lactate, benzoate, chloride, trichlorozincate, tetrachlorozincate, methosulfate and ethosulfate.

10. A process for dyeing or printing material, comprising contacting the material with the dye mixture according to claim 7.

11. The dye mixture according to claim 7, wherein independent from each other
$R^1$, $R^2$ and $R^8$ is ($C_1$-$C_2$)-alkyl,
$R^7$ is ($C_1$-$C_2$)-alkyl or ($C_1$-$C_2$)-alkoxy,
$R^9$ is ($C_1$-$C_2$)-alkyl, ($C_1$-$C_2$)-alkoxy or —$(CH_2)_m$—OH, wherein m is 2 to 4.

12. A dye mixture consisting essentially of at least one dye of formula (I-2)

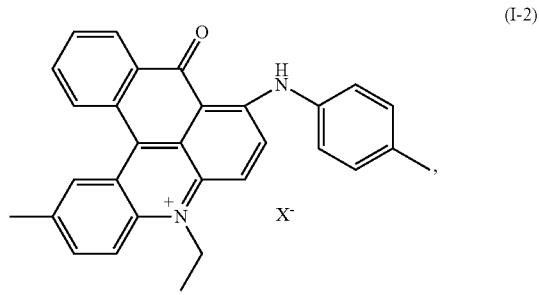
(I-2)

wherein $X^-$ is an anion, and
ii. at least one dye of the formula (IIc) which is selected from the group consisting of:

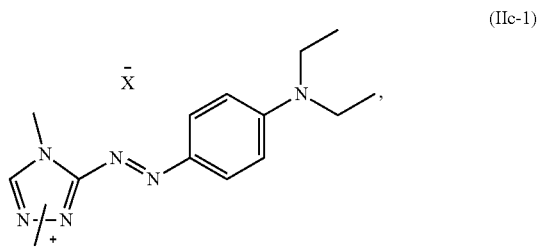
(IIc-1)

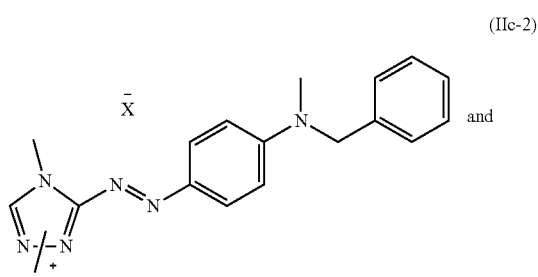
(IIc-2) and

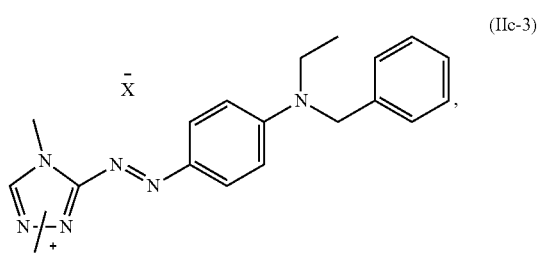
(IIc-3), wherein $X^-$ is an anion.

13. The dye mixture according to claim 12, wherein the anion is selected from the group consisting of halogen, sulfate, hydrogensulfate, aminosulfate, nitrate, phosphate, dihydrogenphosphate, hydrogenphosphate, polyphosphate, hydrogencarbonate, carbonate, methosulfate, ethosulfate, cyanate, tri-chlorozincate, tetra-chlorozincate, ($C_1$-$C_4$)-alkylsulfonate, benzenesulfonate, naphthalinsulfonates, borate, tetraborofluorate, ($C_1$-$C_4$)-alkylcarboxylate, hydroxy-($C_1$-$C_4$)-alkylcarboxylate, benzenecarboxylate and naphthalincarboxylate.

14. The dye mixture according to claim 12, wherein the anion is selected from the group consisting of formiate, acetate, propionate, lactate, benzoate, chloride, trichlorozincate, tetrachlorozincate, methosulfate and ethosulfate.

15. A process for dyeing or printing material, comprising contacting the material with the dye mixture according to claim 12.

* * * * *